July 31, 1962  H. MÜLLER  3,046,862
PHOTOGRAPHIC OBJECTIVE MOUNT
Filed Feb. 20, 1961
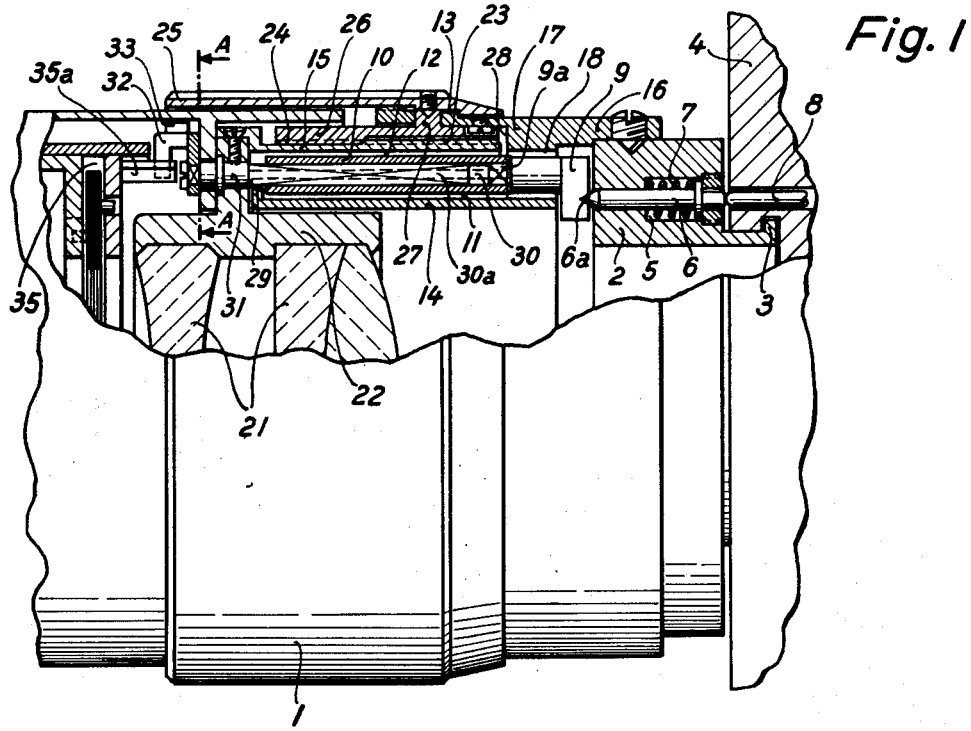
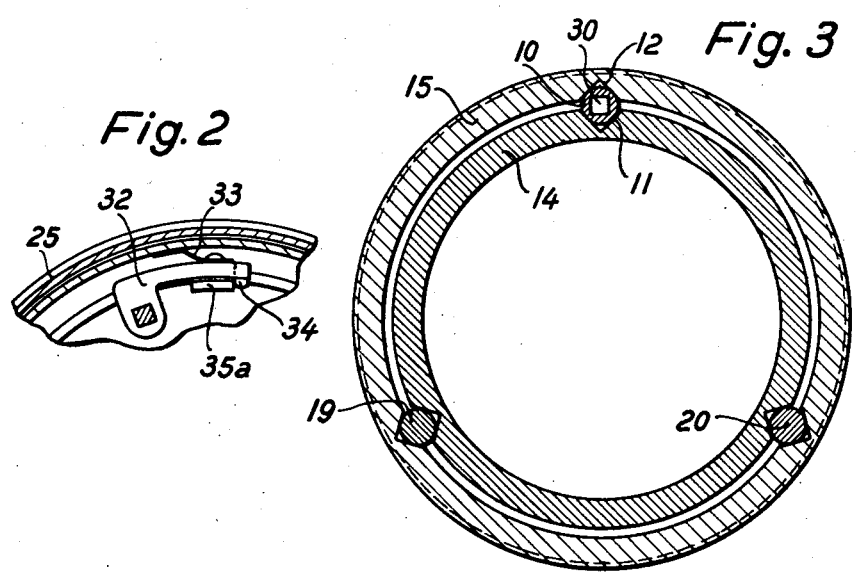
INVENTOR
HELMUT MÜLLER
BY Toulmin & Toulmin
Attorneys

United States Patent Office 3,046,862
Patented July 31, 1962

3,046,862
PHOTOGRAPHIC OBJECTIVE MOUNT
Helmut Müller, Wetzlar (Lahn), Germany, assignor to Ernst Leitz Gesellschaft mit beschränkter Haftung, Wetzlar (Lahn), Germany
Filed Feb. 20, 1961, Ser. No. 90,436
Claims priority, application Germany July 7, 1960
8 Claims. (Cl. 95—45)

The present invention relates to a photographic objective of a camera, more particularly, to an objective having telescopic sleeve members wherein the guide elements between the sleeves to axially guide the sleeves and prevent rotative movement therebetween also function to transmit adjusting movements from an adjusting member on the camera to a moveable component mounted on the objective.

Photographic objectives for cameras have been devised which comprise a pair of telescoping cylindrical sleeves. Guide elements have been interposed between the sleeves in order to axially guide the sleeves and to prevent relative rotative movement between the sleeves. One form of guide structure comprises pairs of cooperating grooves in adjacent surfaces of the sleeves with circular rods being positioned in each pair of grooves.

The resulting guide arrangement is very simple and economical to manufacture and provides a very precise guide structure for the axial movements of the sleeves.

In some objectives, however, movable components are provided therein, which components may be, for example, a spring diaphragm. Structure must then be provided for guiding this component, preferably by actuation of an adjusting member mounted on the camera casing. It is therefore necessary to devise an arrangement for transmitting the movement of the adjusting member to the movable component.

The present invention discloses a structure whereby the guide elements between the cylindrical sleeves of an objective can be used for additional purposes including the transmission of movement between an adjusting member on the camera casing and a movable component in the objective.

It is therefore the principal object of this invention to provide a novel and improved objective mount for a camera.

It is another object of this invention to provide a photographic objective having structure therein to transmit energy from one end of the objective to the other but wherein the overall diameter of the objective is not enlarged.

In the present invention the rod-like guide elements interposed between the cylindrical sleeves are mounted so as to be axially displaceable such as a push-rod in order to transmit mechanical movement from the camera casing to a movable component mounted on the objective.

The present invention also provides for utilizing two or more of the guide elements for transmitting energy from the camera casing of a movable component located in the objective. One of the guide elements may have a circular cross-section so as to be both rotatably and axially movable within its pair of grooves. Accordingly, several functions can be performed by a single guide element. Axial movement of the element can control one function and rotative movement of the element can control another function.

One of the guiding elements is provided with an axial bore through which passes a bolt which has means on both ends thereof for drivingly connecting with an adjusting member on the camera casing and a movable component on the objective. The bore is of a non-circular shape and the bolt has a non-circular cross-section which corresponds to the cross-section of the bore. The bolt has a lever at one end thereof which is engaged by the camera release mechanism. The other end of the bolt is provided with a structure which is drivingly connected to a movable component such as a spring diaphragm.

In addition, one of the bolts may have an axial bore therethrough to serve as a cable duct for an electrical wire which interconnects electrical components located at both ends of the guide elements.

In each of the above-described modifications the guide elements are also used as transmission members which means that no additional elements are necessary to transmit mechanical or electrical energy from the camera casing to a movable component in the objective. As a result, the exterior diameter of the objective mount need not be enlarged but the objective mount of this invention will perform more functions than objective mountings of the prior art.

Other objects and advantages of this invention will become apparent upon reference to the accompanying description when taken in conjunction with the following drawings, wherein FIGURE 1 is a partial longitudinal sectional view of an objective mount having a spring diaphragm in the objective and an adjusting member in the camera casing;

FIGURE 2 is a cross-section taken along the line A—A of FIGURE 1;

FIGURE 3 is a transverse sectional view of the objective illustrated in FIGURE 1, showing the cross-sectional shapes of the guide elements.

A specific embodiment and several modifications of this invention will next be described with reference to the accompanying drawings wherein like reference symbols indicate the same parts throughout the various views.

Returning to FIGURE 1, there is shown an objective 1 havng a stationary mount 2 with bayonet connections 3 extending therefrom to be lockingly received in similarly shaped grooves located in the camera casing 4. The objective mount 2 has an axial bore 5 within which is received a bolt 6 which is biassed outwardly by a spring 7. When the objective is assembled on the camera casing the bolt 6 registers with a pin 8 which is operatively connected with the release mechanism of the camera but not shown in the drawings. When the release mechanism is actuated the bolt 8 moves axially towards the objective to depress the bolt 6 against the action of the spring 7.

The other end of the bolt 6 has a tapered point 6a which meshes with a lever arm 9 which, in turn, extends radially outwardly from a square bolt 9a. The square bolt 9a is received within a square axial bore in a round guide element 10 which is received between registering axial grooves 11 and 12 in the telescoping sleeves 14 and 15, repectively.

As can be seen in FIGURE 3 the registering grooves 11 and 12 form a substantially square spacing within which the guide element 10 is rotatable.

Rotation of the guide element 10 will also rotate the square bolt 9a which is received therein.

The sleeve 14 has an outer flange 16 which is fixedly connected to the stationary objective mount 2. There is a flange 17 which connects the flange 16 with the sleeve 14 and there is an opening 18 through the flange 17 through which the square bolt 9a passes.

Two additional rod-like guiding elements 19 and 20 are positioned between the sleeves 14 and 15 in the same manner as the guide element 10. The guide elements 10, 19 and 20 are positioned approximately 120° apart. These guide elements axially guide the tube or sleeve 15 within which are mounted a plurality of lenses by means of a cylindrical mount 22.

The focussing of the objective is accomplished by axial displacement of the sleeve 15. The sleeve 15 is provided with external threads 23 which mesh with internal threads 24 of an adjusting sleeve 26 developed as a knurled annular band 25. The knurled band 25 together with the adjusting sleeve 26 are secured against axial displacement by a flange 27 which is integral with the adjusting sleeve 26 and which engages a notch 13 in the outer flange 16.

The guiding elements 19 and 20 are also axially displaceable within their pairs of grooves but are limited in their axial movement by a shoulder 29 formed as an external flange on the sleeve 14.

The axial movement of the guide element 10 is limited in one direction also by the flange 29 and in the other direction by the flange 17 of bolt 9a or the lever 9 and the pin 6.

A second square bolt 30a is pivotally mounted journaled at 31 and has a locking lever 32 on the outer end thereof. The bolt 30a is received within a square axial bore 30 which passes through the guide element 10. The bolts 9a and 30a are loosely connected into the square opening 30 so as to prevent the square bolts from determining the position of the circular guide element 10 with respect to the faces of the grooves 11 and 12.

The locking lever 32 is biased into the locking position by a spring 33, as shown in FIGURE 2, and has a locking nose 34 which engages a member 35a mounted on a spring diaphragm mechanism 35 in a known manner.

In the operation of the above-described structure the diaphragm is closed to its predetermined opening when the release mechanism of the camera is actuated. Upon actuation of the release mechanism the pin 8 will be moved to the left as viewed in FIGURE 1, and this movement is transmitted to the pin 6. The tapered point 6a will cam against the lever 9 to cause a pivoting of this lever about the axis of the circular guide element 10. As a result, the locking lever 32, which is also coupled with the guide element 10, also performs a pivoting movement. The pivoting movement of the locking lever 32 will put the locking nose 34 out of the path of movement of the member 35a. This will permit the springs actuating the diaphragm to rotate the diaphragm blade ring in a direction to close the diaphragm opening to the previously selected size. The operation of such a spring diaphragm is conventional and need not be described in detail.

The driving connection between the arm 9 and the locking lever 32 is also maintained during the focussing of the objective. Thus, during the axial displacement of the cylindrical lens mount 22 the connection between the arm 9 and the locking lever 32 is maintained since the length of the square bolt 30a is adjusted to the extension of the cylindrical sleeves.

The guide elements 10, 19 and 20 function as axial guides for the telescoping sleeves during the focussing of the objective. The diameter of the guide elements is so chosen that they all engage the faces of the registering pairs of grooves, such as 10 and 11. The rotation of the guide arm 10 for the axial displacement thereof occurring during the adjustment of the diaphragm will not affect in any way the functioning of the guide arm 10 as an axial guide between the telescoping sleeves.

While the above-described embodiment has shown only one guide element used to transmit mechanical movement through the objective, it is pointed out that the guide elements 19 and 20 can be used to also transmit adjusting movements either in an axial or rotative direction.

The guide elements may be merely provided with an axial bore and electrical wires may be passed therethrough to interconnect electrical components which are mounted adjacent both ends of the axial guides. Thus, a hollow guide element may serve as an electrical conduit.

While the described embodiment related to the use of the guide element with the release mechanism of the camera it is pointed out that any other adjusting member on the camera may be used to guide pin 8 so as to transmit the adjusting movement of the member by means of the guide element to a moveable component mounted in the objective.

This it can be seen that the present invention discloses a photographic objective wherein elements for guiding the axial movement of telescoping sleeves in an objective are also used to transmit either mechanical or electrical energy from one portion of the objective to another portion thereof.

It will be understood that this invention is susceptible to modification in order to adapt it to different usages and conditions and, accordingly, it is desired to comprehend such modifications within this invention as may fall within the scope of the appended claims.

What I claim is:

1. In a photographic objective having a moveable component, the combination of a pair of telescoping cylindrical sleeves, there being a plurality of pairs of cooperating axial grooves in the adjacent surfaces of said sleeves, a corresponding plurality of rod-like guiding elements positioned in said pairs of grooves so that said sleeves are axially moveable with respect to each other but rotary movement therebetween is prevented, and means on one of said guiding elements for drivingly interconnecting a moveable objective component with an adjusting means on the camera so as to transmit the adjusting movements to the moveable objective component.

2. In a camera, the combination of an objective having a moveable component thereon, means on said camera for adjusting said moveable component, said objective comprising a pair of telescoping cylindrical sleeves, there being a plurality of pairs of cooperating axial grooves in the adjacent surfaces of said sleeves, a plurality of guiding elements positioned in said pairs of grooves so that said sleeves are axially moveable with respect to each other but rotary movement therebetween is prevented, and means on one of said guiding elements for drivingly interconnecting said moveable objective component with said adjusting means so that the adjusting movement is transmitted to the moveable objective component.

3. An objective comprising a moveable component, a pair of telescoping cylindrical sleeves, there being a plurality of pairs of cooperating axial grooves in the adjacent surfaces of said sleeves, a corresponding plurality of rod-like guiding elements positioned in said pairs of grooves so that said sleeves are axially moveable with respect to each other but rotary movement therebetween is prevented, and means on one of said guiding elements for drivingly interconnecting said moveable objective component with an adjusting member on a camera so as to transmit the adjusting movement of the member to the moveable objective component.

4. An objective comprising a moveable component, a pair of telescoping cylindrical sleeves, there being a plurality of pairs of cooperating axial grooves in the adjacent surfaces of said sleeves, a corresponding plurality of rod-like guiding elements positioned in said pairs of grooves so that said sleeves are axially moveable with respect to each other but rotary movement therebetween is prevented, one of said guiding elements being axially moveable in a pair of grooves and interconnecting said moveable component and an adjusting member of the camera so that axial movement of said one guiding element actuates said moveable component.

5. An objective comprising a moveable component, a pair of telescoping cylindrical sleeves, there being a plurality of pairs of cooperating axial grooves in the adjacent surfaces of said sleeves, a corresponding plurality of rod-like guiding elements positioned in said pairs of grooves so that said sleeves are axially moveable with respect to each other but rotary movement therebetween is prevented, and means on one of said guiding elements for drivingly interconnecting said moveable objective component with an adjusting member on a camera so as to transmit the adjusting movement of the member to the moveable objective component, one of said guiding elements having a circular cross-section so as to be rotatable about its own axis within its pair of grooves, and means on said rotatable guiding element for drivingly interconnecting said moveable objective component with an adjusting member on the camera so as to transmit the adjusting movement to the moveable objective component.

6. An objective comprising a moveable component, a pair of telescoping cylindrical sleeves, there being a plurality of pairs of cooperating axial grooves in the adjacent surfaces of said sleeves, a corresponding plurality of rod-like guiding elements positioned in said pairs of grooves so that said sleeves are axially moveable with respect to each other but rotary movement therebetween is prevented, one of said guiding elements being both axially moveable and rotatable in its pair of grooves, and means on said one guiding element for drivingly interconnecting said moveable objective component with an adjusting member on the camera so that movement of the adjusting member is transmitted to the moveable objective component.

7. An objective comprising a moveable objective component, a pair of telescoping cylindrical sleeves, there being a plurality of pairs of cooperating axial grooves in the adjacent surfaces of said sleeves, a corresponding plurality of rod-like guiding elements positioned in said pairs of grooves so that said sleeves are axially moveable with respect to each other but rotary movement therebetween is prevented, one of said guiding elements having a round cross-section so as to be rotatable within its pair of grooves and having an axial bore therethrough of polygonal cross-section, a bolt slidably mounted within said axial bore and having a cross-section corresponding thereto, and means on one end of said bolt for operatively connecting with an adjusting member on the camera and means on the other end of said bolt for operatively connecting with said moveable objective component.

8. An objective comprising a moveable objective component, a pair of telescoping cylindrical sleeves, there being a plurality of pairs of cooperating axial grooves in the adjacent surfaces of said sleeves, a corresponding plurality of rod-like guiding elements positioned in said pairs of grooves so that said sleeves are axially moveable with respect to each other but rotary movement therebetween is prevented, there being an axial bore in one of said guide elements, there being electrical circuit components on both sides of said guiding elements and an electrical lead passing through said axial bore in said one guiding element and connecting said electrical components.

References Cited in the file of this patent
UNITED STATES PATENTS
2,969,008     Ferrari _____ Jan. 24, 1961